A. CHRISTIAN.
Childrens' Carriage.
No. 3,636. Reissued Sept. 14, 1869.
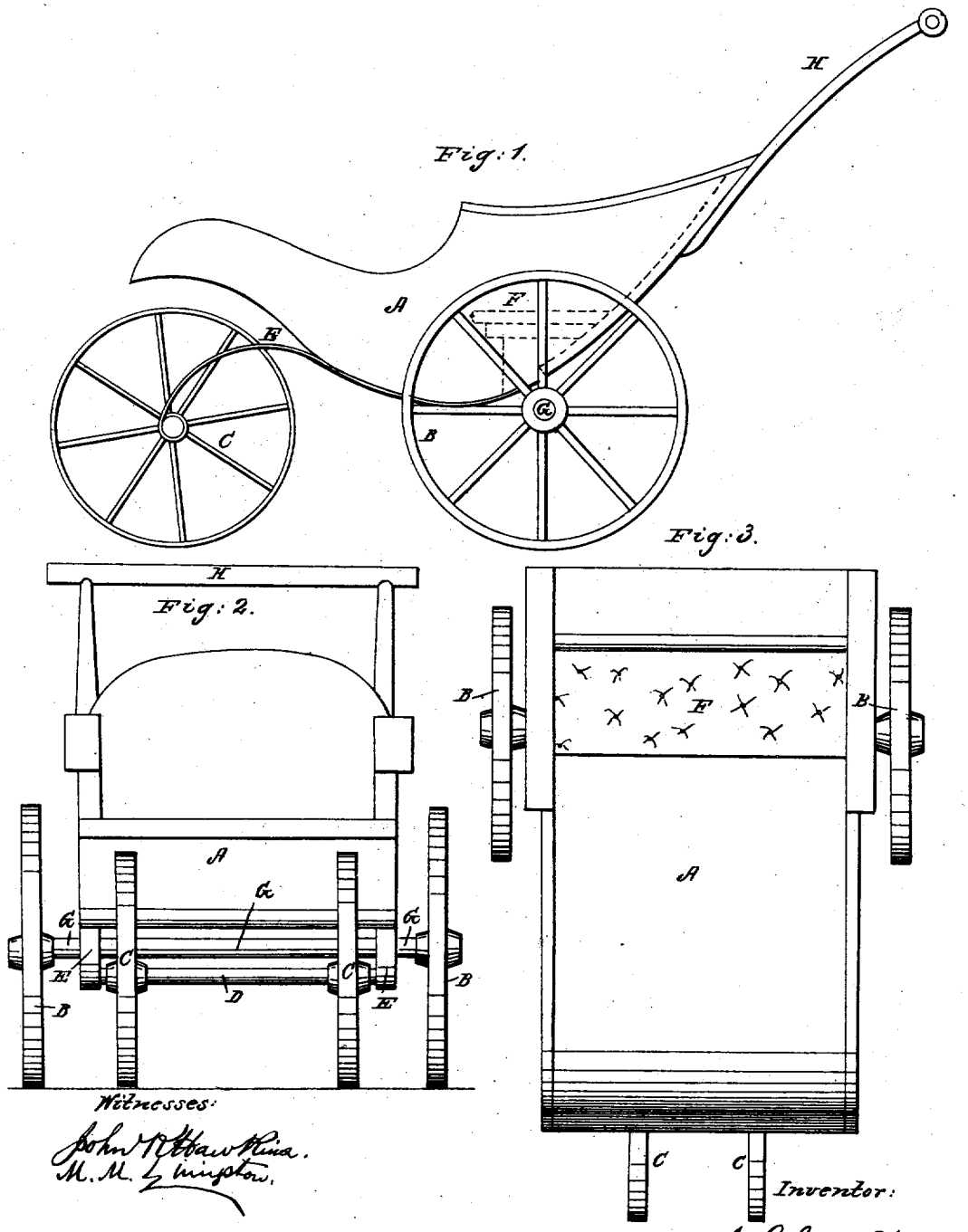
N. PETERS. Photo-Lithographer. Washington, D. C.

UNITED STATES PATENT OFFICE.

ANDREW CHRISTIAN, OF NEW YORK, N. Y.

IMPROVED CHILD'S CARRIAGE.

Specification forming part of Letters Patent No. 54,111, dated April 24, 1866; Reissue No. 3,074, dated August 11, 1868; Reissue No. 3,636, dated September 14, 1869.

*To all whom it may concern:*

Be it known that I, ANDREW CHRISTIAN, of the city of New York, in the county and State of New York, have invented a new and Improved Child's Carriage; and I do hereby declare that the following is a full, clear, and exact description of the same, reference being had to the accompanying drawings, which form part of this specification.

My present invention relates particularly to that class of children's carriages technically called "perambulators;" and it consists in a child's carriage or perambulator which, as a whole, is of a new organization, and is composed of the following principal parts in combination, to wit: a body provided with a permanent seat and a propelling-handle, two rear wheels arranged at respective ends of an axle supporting the rear part of the carriage-body, and two forward wheels arranged within two parallel lines drawn from the widest part of the body in the direction of the length of the carriage, or between the forward ends of the sills of the carriage, or equivalent supporting-pieces.

The feature which distinguishes my improved perambulator from the style of perambulator hereinbefore alluded to, which existed before my invention, is a second additional front wheel arranged within the side lines of the body, as aforesaid. By such construction I am enabled to produce a perambulator which, as a whole, is far superior to any style previously constructed; and among the advantages which my perambulator possesses may be mentioned the removing of any liability of the perambulator being overturned or upset in crossing streets, occasioned by the raising and sustaining of the perambulator upon a single front wheel when raising said perambulator over the curbstone; and, moreover, a much more neat and attractive article is produced—one which finds a readier sale and commands a higher price in the market.

In the accompanying drawings, Figure 1 is a side elevation of the carriage; Fig. 2, a front view, and Fig. 3 a top view, thereof.

Similar letters indicate like parts in all the figures.

A designates the body of the carriage, and this may be of the usual or any suitable form for that class of carriages technically called "perambulators." The body is supported at its rear end by two wheels, B B, and at its forward end by two wheels, C C. The wheels B B are arranged to revolve on respective ends of an axle, G, which projects out at either side beyond the sides of the body A, the arrangement of these wheels being not unlike either the back or front pair of wheels of a roadway-carriage, though it is evident that they may be fitted to revolve with the axle, similar to railway-car wheels.

I have shown the body as mounted on reaches, which I term "sills," and have lettered them E in the drawings, which sills are supported by the rear and front wheels, B B, C C. The wheels C C (refer to Fig. 2) are shown as permanently secured to a front axle, D, which has its bearings in the said sills E. Hence they are within or between two parallel lines drawn in a forward direction from the widest portion of the body. The wheels C C, instead of being fitted to revolve with the axle, may be mounted so as to revolve upon a fixed axle, and, indeed, the wheels may have independent supports from each other—such, for instance, as hangers or boxes depending from the forward end of the body or reaches or sills. They are, however, in all cases to be arranged within the side lines of the body, as aforesaid, so as to be out of the way—that is to say, I do not intend to have them fitted to revolve upon or with an axle, which places them beyond the sides of the carriage like the wheels B B, for that is old in roadway-carriages. Within the body a permanent seat, F, is placed, as shown in Figs. 2 and 3, upon which the occupant of the vehicle sits. The body is provided with a propelling-handle, H, as clearly shown in Fig. 1.

From the above description it must appear obvious that in a perambulator constructed as above described—that is, with two front wheels arranged as specified—the liability of the vehicle being upset while in the act of raising it over a curbstone is obviated, and that in cases where but one wheel is used the support consists merely of the narrow periphery of a wheel, while in perambulators constructed according to my invention a good and sufficient support is obtained, and hence the vehicle may be managed much more easily; and, besides all this, such vehicle, as before stated, is far more comely and more eagerly sought for in the market, and commands a much higher price, all of which is due to the new feature which I add to this class of carriages.

What I claim as my invention, and desire to secure by Letters Patent, is—

The new article of manufacture of a child's carriage or perambulator, constructed substantially as herein specified—that is to say, the combination, in order to produce such carriage, of the following parts, to wit: a body provided with a permanent seat and a handle, two rear wheels, which are placed one at each side of the body, and two forward wheels, which are arranged within parallel lines drawn forward from either side of the carriage-body, substantially as and for the purposes herein specified.

A. CHRISTIAN.

Witnesses:
JOHN K. HAWKINS,
F. B. BEECHER.